US006438511B1

(12) United States Patent
McKenzie et al.

(10) Patent No.: US 6,438,511 B1
(45) Date of Patent: Aug. 20, 2002

(54) POPULATION DATA ACQUISITION SYSTEM

(75) Inventors: Ian D. McKenzie, Canton; John E. Longnecker, Livonia, both of MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 09/712,601

(22) Filed: Nov. 14, 2000

(51) Int. Cl.[7] .............................................. G01M 17/00
(52) U.S. Cl. ......................... 702/179; 701/29; 701/101
(58) Field of Search ........................... 702/179; 701/29, 701/31, 34, 35, 99, 101

(56) References Cited

U.S. PATENT DOCUMENTS 5,067,099 A 11/1991 McCown et al.
5,172,785 A * 12/1992 Takahashi .................. 180/271
5,293,317 A * 3/1994 Adrain et al. ............... 123/486
5,303,163 A * 4/1994 Ebaugh et al. ............. 340/439
5,318,449 A 6/1994 Schoell et al.
5,361,628 A 11/1994 Marko et al.
5,387,870 A 2/1995 Knapp et al.
5,446,665 A * 8/1995 Adrian et al. ............... 123/486
5,463,567 A 10/1995 Boen et al.
5,541,840 A * 7/1996 Gurne et al. .................. 701/33
5,638,273 A 6/1997 Coiner et al.
5,648,898 A * 7/1997 Moore-McKee et al. ..... 700/86
5,754,965 A * 5/1998 Hagenbuch ................. 340/439
5,781,871 A 7/1998 Mezger et al.
5,847,644 A * 12/1998 Weisman et al. ........... 340/439
5,884,210 A * 3/1999 Rettig et al. ................ 180/167
5,930,553 A * 7/1999 Hirst et al. ................... 399/12
5,948,026 A * 9/1999 Beemer, II et al. ........... 701/35
5,954,617 A * 9/1999 Horgan et al. .............. 123/349
6,006,146 A 12/1999 Usui et al.
6,073,063 A * 6/2000 Leong Ong et al. .......... 701/29
6,269,300 B1 * 7/2001 Moore-McKee et al. .......... 123/27 GE
6,306,063 B1 * 10/2001 Horgan et al. .............. 340/439
6,330,499 B1 * 12/2001 Chou et al. ................... 701/32

OTHER PUBLICATIONS

Majeske et al., "Determing Warranty Benefits for Automobile Design Changes", IEEE, 1998.*

* cited by examiner

*Primary Examiner*—Patrick Assouad
(74) *Attorney, Agent, or Firm*—Brooks & Kushman P.C.

(57) ABSTRACT

A method of acquiring population data from engine control modules provided with a memory for storing data relating to parameters of engine operation. The method includes the steps of downloading stored data from a plurality of engine control modules when the engine control modules are reprogrammed. A set of population data is developed and communicated to a central database. The population data is statistically analyzed when a statistically significant portion of the population is obtained. The statistical analysis of the population data is then used to make engine design modifications, provide warranty problem analysis, and analysis of optional feature acceptance.

20 Claims, 2 Drawing Sheets

POPULATION DATA ACQUISITION SYSTEM

TECHNICAL FIELD

The present invention relates to a system and method for acquiring population data from engine control modules and performing statistical analyses for use in calibrating, diagnosing, and designing an engine.

BACKGROUND ART

Electronically controlled internal combustion engines are used in a wide variety of applications including passenger vehicles, marine vessels, earth moving and construction equipment, stationary generators, and on-highway trucks, among others. Electronic engine controls provide a wide range of flexibility in tailoring engine performance to a particular application without significant changes to engine hardware. Typical engines include sensors used to control the engine and for providing information to the vehicle owner, operator, and service personnel.

Sensors may be used to provide engine protection by quickly detecting adverse operating conditions which may indicate a fault or malfunction to reduce or eliminate any permanent engine damage. The engine control module (ECM) monitors the sensor inputs to detect conditions that may trigger a diagnostic code or fault message which may be used to warn operators of a problem. The diagnostic code or fault message may also be used by service personnel, and maintenance personnel to troubleshoot and repair the engine. Calibration variables are used to set the acceptable operating parameters for the engine and typically vary based on the engine size, type, and the application for the engine. While some calibration values are set by factory personnel, many may be modified by or at the request of the owner/operator based on the particular application.

When an engine is serviced, information from the engine ECM data storage devices can be used locally by service personnel to analyze engine operation faults. This information is not currently accumulated or analyzed on a statistical basis to make engine design modifications, optimize engine calibration design, collect warranty data, or determine the extent of optional feature acceptance by customers.

These and other problems and disadvantages inherent in the prior art are addressed by the present invention.

DISCLOSURE OF INVENTION

According to the present invention, a method is provided for acquiring population data from engine control modules having a memory for storing data relating to parameters from engine operation. Stored data is downloaded from a plurality of engine control modules when they are reprogrammed to develop a set of population data. The stored population data is communicated to a central data base. After a statistically significant portion of the population is received by the central database, population data may be analyzed to make engine design modifications.

According to other aspects of the invention, the stored data is obtained from sensors that measure engine operating parameters. The sensors may be selected from the group of sensors including, but not limited to, temperature sensors, pressure sensors, restriction sensors, and fluid level sensors. The stored data may also be a calculated parameter or a set of engine calibration configuration settings.

According to the method of the invention, the step of statistically analyzing population data may include performing statistical calculations such as mean calculations, minimum experience value calculations, maximum experience value calculations, standard deviation calculations, histogram plots, trend analysis calculations, and frequency of incident calculations. Analyzing population data statistically may also extend to correlating the time of an incident with other parameters relating to engine operation. According to the invention, the statistical analysis of the population data may be utilized to design hardware, optimize engine calibrations, collect warranty data or determine the extent of optional feature acceptance by customers.

These and other objects and advantages of the present invention will be apparent to one of ordinary skill in the art in view of the attached drawings and following detailed description of a best mode of practicing the invention.

BEST MODE FOR CARRYING OUT THE INVENTION

Figure 1:
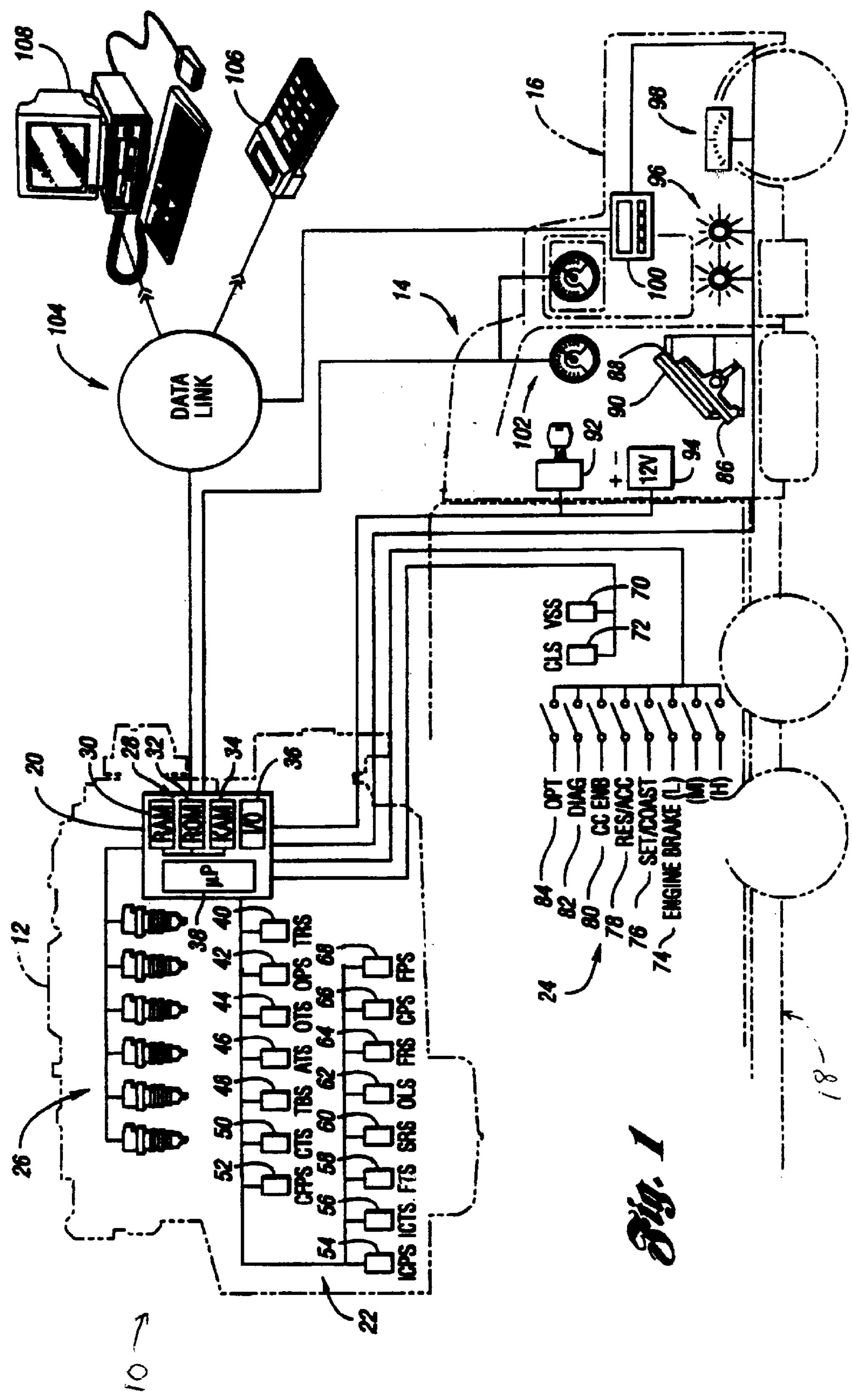
FIG. 1 is a block diagram illustrating a prior art internal combustion engine having sensors and an engine control module from which population data may be obtained.

FIG. 1 provides a schematic/block diagram illustrating an engine from which population data may be obtained according to one embodiment of the present invention. System 10 includes an internal combustion engine, such as a diesel engine 12, which may be installed in a vehicle 14 depending upon the particular application. In one embodiment, vehicle 14 includes a tractor 16 and semi-trailer 18. Diesel engine 12 is installed in tractor 16 and interfaces with various sensors and actuators located on engine 12, tractor 16, and semi-trailer 18 via engine and vehicle wiring harnesses as described in further detail below.

An electronic engine control module (ECM) 20 receives signals generated by engine sensors 22 and vehicle sensors 24 and processes the signals to control engine and/or vehicle actuators such as fuel injectors 26. ECM 20 preferably includes computer-readable storage media, indicated generally by reference numeral 28 for storing data representing instructions executable by a computer to control engine 12. Computer-readable storage media 28 may also include calibration information in addition to working variables, parameters, and the like. In one embodiment, the computer-readable storage media 28 includes a random access memory (RAM) 30 in addition to various non-volatile memory such as read-only memory (ROM) 32, and keep-alive memory (KAM) 34. Computer-readable storage media 28 communicate with a microprocessor 38 and input/output (I/O) circuitry 36 via a standard control/address bus. As will be appreciated by one of ordinary skill in the art, computer-readable storage media 28 may include various types of physical devices for temporary and/or persistent storage of data which includes solid state, magnetic, optical, and combination devices. For example, computer readable storage media 28 may be implemented using one or more physical devices such as DRAM, PROMS, EPROMS, EEPROMS, flash memory, and the like. Depending upon the particular application, computer-readable storage media 28 may also include floppy disks, CD ROM, and the like.

In a typical application, ECM 20 processes inputs from engine sensors 22, and vehicle sensors/switches 24 by executing instructions stored in computer-readable storage media 28 to generate appropriate output signals for control of engine 12. Depending upon the particular application, the system 10 may include various types of sensors to monitor engine and vehicle operating conditions. In one embodiment of the present invention, engine sensors 22 include a timing reference sensor (TRS) 40 which provides an indication of the crankshaft position and may be used to determine engine speed. An oil pressure sensor (OPS) 42 and oil temperature sensor (OTS) 44 are used to monitor the pressure and temperature of the engine oil, respectively.

An air temperature sensor (ATS) 46 is used to provide an indication of the current intake air temperature. A turbo boost sensor (TBS) 48 is used to provide an indication of the boost pressure of a turbocharger. Coolant temperature sensor (CTS) 50 is used to provide an indication of the coolant temperature.

Depending upon the particular engine configuration and application, various additional sensors may be included. For example, engines utilizing a common rail fuel system may include a corresponding fuel pressure sensor (CFPS) 52. Similarly, an intercooler coolant pressure sensor (ICPS) 54 and temperature sensor (ICTS) 56 may be provided to sense the pressure and temperature of the intercooler coolant. Engine 12 also preferably includes a fuel temperature sensor (FTS) 58 and a synchronous reference sensor (SRS) 60. SRS 60 provides an indication of a specific cylinder in the firing order for engine 12.

Engine 12 may also include an oil level sensor (OLS) 62 to provide various engine protection features related to a low oil level. A fuel restriction sensor (FRS) 64 may be used to monitor a fuel filter and provide a warning for preventative maintenance purposes. A fuel pressure sensor (FPS) 68 provides an indication of fuel pressure to warn of impending power loss and engine fueling. Similarly, a crankcase pressure sensor (CPS) 66 provides an indication of crankcase pressure which may be used for various engine protection features by detecting a sudden increase in crankcase pressure indicative of an engine malfunction.

System 10 preferably includes various vehicle sensors/switches 24 to monitor vehicle operating parameters and driver input used in controlling vehicle 14 and engine 12. For example, vehicle sensors/switches 24 may include a vehicle speed sensor (VSS) 70 which provides an indication of the current vehicle speed. A coolant level sensor (CLS) 72 monitors the level of engine coolant in a vehicle radiator. Switches used to select an engine operating mode or otherwise control operation of engine 12 or vehicle 14 may include an engine braking selection switch 74 which preferably provides for low, medium, high, and off selections, cruise control switches 76, 78, and 80, a diagnostic switch 82, and various optional, digital, and/or analog switches 84. ECM 20 also receives signals associated with an accelerator or foot pedal 86, a clutch 88, and a brake 90. ECM 20 may also monitor position of a key switch 92 and a system voltage provided by a vehicle battery 94.

ECM 20 may communicate with various vehicle output devices such as status indicators/lights 96, analog displays 98, digital displays 100, and various analog/digital gauges 102. In one embodiment of the present invention, ECM 20 utilizes an industry standard data link 104 to broadcast various status and/or control messages which may include engine speed, accelerator pedal position, vehicle speed, and the like. Preferably, data link 104 conforms to SAE J1939 and SAE J1587 to provide various service, diagnostic, and control information to other engine systems, subsystems, and connected devices such as display 100.

A service tool 106 may be periodically connected via data link 104 to program selected parameters stored in ECM 20 and/or receive diagnostic information from ECM 20. Likewise, a computer 108 may be connected with the appropriate software and hardware via data link 104 to transfer information to ECM 20 and receive information relating to operation of engine 12, and/or vehicle 14. A plurality of computers 108 in remote locations throughout the world are part of a worldwide programming system 110, as shown in FIG. 2.

Figure 2:
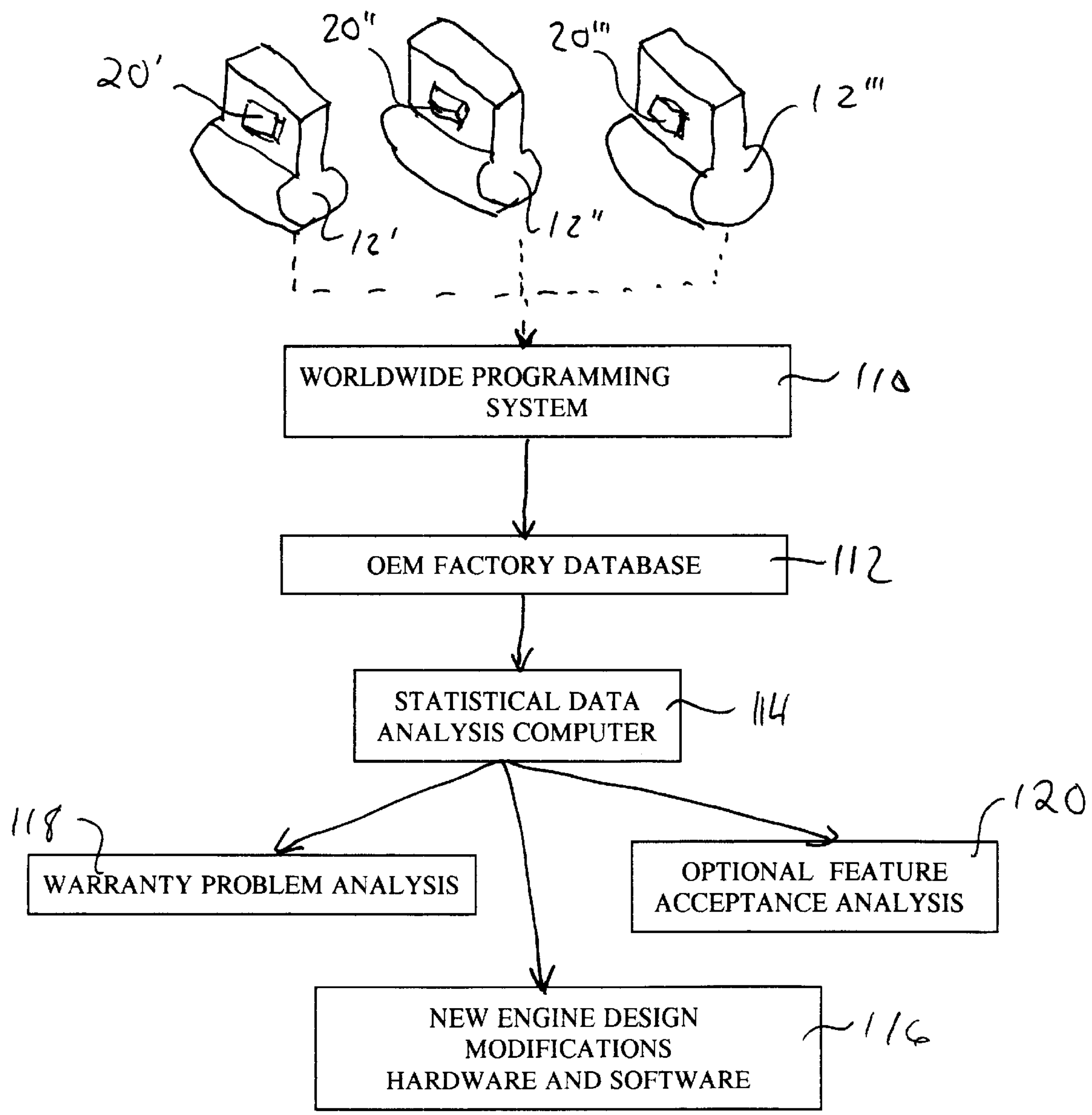
FIG. 2 is a block diagram illustrating the system and method for acquiring population data from engine control modules and performing statistical analyses for use in calibrating, diagnosing, and designing and engine.

Referring now to FIG. 2, a plurality of engines 12', 12", 12'" having corresponding engine control modules 20', 20", 20'" are illustrated being linked to the worldwide programming system 110. As the engines 12 are brought in for service and recalibrated, stored data is downloaded from the plurality of engine control modules 20. Data from the engine control module 20 that has been sensed by engine sensors 22 are communicated via a data link to the OEM factory database at 112. The database 112 could also be located remote from the OEM and managed by a third party such as an independent contractor. The OEM factory database 112 accumulates the data as stored population data. Once a statistically significant population of data has been accumulated, statistical analysis may be performed at 114. The statistical analysis may include mean calculations, minimum experience value calculations, maximum experience value calculations, standard deviation calculations, histogram plots, trend analysis calculations, and frequency of incident calculations. Data from various sensors may be correlated with time of incident data.

The statistical data may be used to develop new engine design modifications including hardware or software modifications at 116. The information may also be used to assess warranty problems at 118 or may be used to perform an analysis of optional feature acceptance at 120. Optional features such as engine speed control, fuel economy strategies, low gear torque limiting and other features may be analyzed to provide useful information as to whether or not optional features are actually enabled by customers in the field.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of acquiring population data from engine control modules having a memory for storing data relating to parameters of engine operation comprising:

- downloading stored data from a plurality of different engine control modules having the memory for storing data relating to parameters of engine operation when the control modules are reprogrammed;
- communicating stored data to a central database for accumulation of the stored data from the plurality of different engine control modules into a set of population data;
- analyzing population data statistically upon collecting a statistically significant portion of the population; and
- utilizing statistical analysis of population data to develop new engine design modifications.

2. The method of claim 1 wherein the stored data is obtained from sensors that measure engine operating parameters.

3. The method of claim 2 wherein the sensors are selected from the group of sensors comprising:

temperature sensors;

pressure sensors;

restriction sensors; and fluid level sensors.

4. The method of claim 1 wherein the stored data is a calculated parameter.

5. The method of claim 1 wherein the stored data is a set of engine calibration and configuration settings.

6. The method of claim 1 wherein the stored data is a set of parameters acquired from other systems via a data link.

7. The method of claim 1 wherein the step of analyzing population data statistically relates to performing statistical calculations selected from the group of calculations comprising:

mean calculations;

minimum experienced value calculations;

maximum experienced value calculations;

standard deviation calculations;

histogram plots;

trend analysis calculations; and frequency of incident calculations.

8. The method of claim 1 wherein the step of analyzing population data statistically relates to correlating the time of an incident to parameters from engine operation.

9. The method of claim 1 wherein the step of utilizing statistical analysis of population data comprises designing hardware in accordance with requirements of the engine as determined by the statistical analysis.

10. The method of claim 1 wherein the step of utilizing statistical analysis of population data comprises optimizing engine calibrations in accordance with actual use data.

11. The method of claim 1 wherein the step of utilizing statistical analysis of population data comprises collecting warranty data.

12. The method of claim 1 wherein the step of utilizing statistical analysis of population data comprises determining the extent of optional feature acceptance by customers.

13. A system for acquiring population data from engine control modules having a memory for storing data relating to parameters of engine operation comprising:

at least one service computer for downloading stored data from a plurality of different engine control modules having the memory for storing data relating to parameters of engine operation when the engine control modules are reprogrammed;

a data link for communicating stored population data to a central database for accumulation of the stored data from the plurality of different engine control modules into a set of population data;

a computer for analyzing population data statistically upon collecting a statistically significant portion of the population; and a reporting device for making available statistical analysis of population data to develop new engine design modifications decisions.

14. The system of claim 13 wherein the stored data is obtained from sensors that measure engine operating parameters.

15. The system of claim 14 wherein the sensors are selected from the group of sensors comprising:

temperature sensors;

pressure sensors;

restriction sensors; and fluid level sensors.

16. The system of claim 13 wherein the computer for analyzing population data statistically performs statistical calculations selected from the group of calculations comprising:

mean calculations;

minimum experienced value calculations;

maximum experienced value calculations;

standard deviation calculations;

histogram plots;

trend analysis calculations; and frequency of incident calculations.

17. The system of claim 13 wherein the computer for analyzing population data statistically correlates the time of an incident to parameters of engine operation.

18. The system of claim 13 wherein the reporting device for statistical analysis of population data is used in designing hardware in accordance with requirements of the engine as determined by the statistical analysis.

19. The system of claim 13 wherein the reporting device for statistical analysis of population data is used in optimizing engine calibrations in accordance with actual use data.

20. The system of claim 13 wherein the reporting device for statistical analysis of population data is used in collecting warranty data.

* * * * *